Oct. 20, 1970         R. A. SHUEY              3,534,984
                        COUPLING
Filed April 1, 1968                        3 Sheets-Sheet 1

INVENTOR.
Robert A. Shuey
BY Hastings Ackley
and
Walter J. Jackman
ATTORNEYS

Oct. 20, 1970  R. A. SHUEY  3,534,984
COUPLING

Filed April 1, 1968  3 Sheets-Sheet 3

INVENTOR.
Robert A. Shuey
BY
ATTORNEYS

United States Patent Office 3,534,984
Patented Oct. 20, 1970

3,534,984
COUPLING
Robert A. Shuey, 4405 Highland Drive,
Dallas, Tex. 75205
Filed Apr. 1, 1968, Ser. No. 717,713
Int. Cl. F16l 35/00, 39/00
U.S. Cl. 285—24                                    24 Claims

ABSTRACT OF THE DISCLOSURE

A method and means for connecting the end of a subwater flow conductor to a flow conductor lowerable from the surface of a body of water by means of a male and female coupling sections connected to the ends of the two flow conductors which are telescopical relative to one another and having guy cables connected to the coupling section connected to the subwater flow conductor by means of which the other coupling section on the end of the other flow conductor is guided to the subwater coupling section and wherein the coupling has hydraulic rams for holding the two coupling sections in telescoped position while a sealing substance is introduced between the two coupling sections to seal and set therebetween and rigidly securing the two sections to one another in seal tight relation.

---

This invention relates to a method for connecting two flow conductors to one another and to a coupling for connecting two flow conductors to one another.

An object of this invention is to provide a new and improved coupling for connecting the bottom end of a flow conductor which is movable downwardly from a platform, such as a vessel, to an end of a flow conductor which is resting on the earth at the bottom of a body of water.

Another object is to provide a coupling having two sections, one of which is connected to the end of the subwater flow conductor and the other which is connectible to the lower end of the flow conductor which is to be connected thereto, the coupling sections having portions telescopical relative to one another and providing a wedge fit therebetween and means for holding the two coupling sections in telescoped relation.

Still another object is to provide a coupling having ram means operable from the surface of the water for holding the two coupling sections in rigid telescoped relation to one another, and means for introducing a plastic sealing agent between the two sections to secure the sections to one another and seal therebetween.

A further object is to provide a coupling having a female section provided with a downwardly and inwardly inclined wedge surface connectible to the end of a subwater flow conductor, guy cables secured thereto in predetermined circumferentially spaced relationship, and latch bores spaced in predetermined relationship outwardly of its inclined wedge surface, and a male coupling section connectible to the bottom end of a flow conductor which is to be lowered into the water and connected to the subwater flow conductor which has a prong portion provided with a downwardly and inwardly inclined annular wedge surface engageable with the female coupling section for providing a wedge fit therebetween, and a plurality of hydraulically operable ram means operable from the surface of the water having piston means moving downwardly through the latch bores of the female coupling section for exerting a force to hold the two sections in telescoped wedged relation to one another, the male coupling section and the guy cables cooperating to orient the male section relative to the female coupling section in position wherein the piston means is placed in alignment with the latch bores as the two sections are telescoped.

A still further object is to provide a coupling wherein the male and female sections are provided with external and internal annular recesses which are aligned with one another when the two sections are in telescoped relation and into which a sealing agent may be introduced from the surface to seal and set therebetween and rigidly secure the two sections to one another.

Another object is to provide a coupling of the type described wherein one of the sections, such as the male section, is provided with lock means in its external recess which are movable into the internal recess of the female coupling section for locking the male section again disengaging movement relative to the female section when the two sections are in telescoped relation.

Still another object is to provide a coupling having means for providing a signal when the two sections move into properly oriented and telescoped relationship to one another.

A still further object is to provide a method of connecting two flow conductors to one another by guiding the end of one flow conductor provided with a coupling section to position the coupling section in properly oriented and telescoped relation with a second coupling section secured to the other flow conductor, holding the two coupling sections in rigid coupled relationship to one another while a suitable sealing agent is circulated between the two sections and is allowed to set and secure the two sections against disengagement from one another.

Additional objects and advantages of the invention will be readily apparent from the reading of the following description of a device constructed in accordance with the invention, and reference to the accompanying drawings thereof, wherein:

FIG. 6 is a schematic view of the signalling circuit of the coupling;

Figure 9:
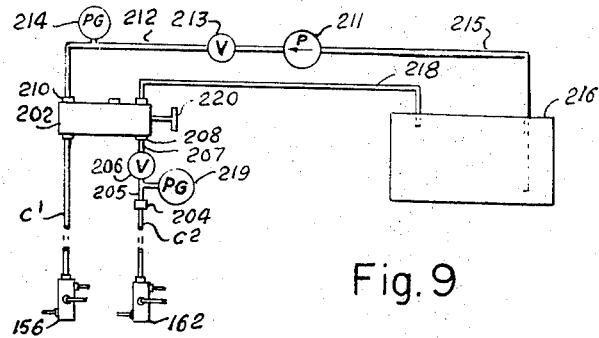
FIG. 9 is a fragmentary schematic view of the hydraulic control system of the coupling.

Referring now to the drawings, the coupling 10 for connecting the lower end of a flow conductor 11, such as a riser pipe, to an end section 12 of a flow conductor or pipe 13, lying on or buried in the earth at the bottom of a body of water, includes a female coupling section 14 having a tubular spacer 15 to whose bottom end is welded a bottom flange 16 and to whose upper end is welded an annular female connector member 17. The bottom flange is detachably secured in fluid tight relation to the top flange 18 of the end section 12 in the usual manner by bolts 18a and a seal ring 19 which is received in aligned annular recess of the flanges in the usual manner. A frangible or drillable closure disk 20 is interposed between the flanges 16 and 18 and secured thereto by the bolts in seal tight relationship to close the end of the pipe 13.

The female connector member 17 includes a bottom internal annular flange 21 telescoped over the upper end of the spacer 15 and rigidly secured thereto by a weld 22. The connector member has an upwardly and outwardly extending annular internal surface 24 and internal annular lock recess 25 intermediate the top and bottom ends of the internal surface 24 and opening therethrough.

The female connector member also has an external annular top flange 27 which is provided with three annular latch bores 28a, 28b and 28c spaced apart substantially 120 degrees and three cable bores 29a, 29b, and 29c spaced from one another approximately 120 degrees and each of which is positioned between an adjacent pair of the latch bores.

The lower ends of three guy cables 31a, 31b, and 31c, extend through the cable bores 29a, 29b and 29c, respectively, and are secured against upward movement therethrough by sleeves 32 secured to their lower end portions which are telescoped upwardly into the cable bores. The sleeves are provided with external flanges 33 which abut the bottom surface of the top flange.

The top flange of the retainer body has a three positioning or index members 35a, 35b and 35c having upwardly and inwardly converging conical outer surfaces 36 and their bottom portions secured, as by a wedge fit, in upwardly opening bores 38 of the top flange. The positioning members are preferably spaced 120 degrees apart.

The guy cables extend to the surface of the body of water and are secured to a float 42 which is shown as a torus but may be of any desired configuration. The cables 31 are identified by any suitable indicia means, such as different colors, numbers, tags or the like so that the relationship of the three cables to the positioning members 35a, 35b and 35c can be readily determined at the surface of the water for purposes which will be described below.

The upper end of the female connector member and its latch bores are preferably closed by a thin but relatively tough plastic film, such as polyethylene film or the like. The film is provided to prevent the fouling of the surfaces of the connector member by barnacles, sand or the like and the introduction of such foreign substances into the central bore or passage of the female connector member.

A spider or traveler 43 provided with three passages 44a, 44b and 44c which are spaced from the center of the traveler the same distance as are the cable bores 29 and also spaced apart 120 degrees from each other. The guy cables 31a, 31b and 31c extend through the passages 44a, 44b and 44c, respectively, and to the float to which they are secured in any suitable manner. The traveler is provided at its mid-point with a swivel connector 46 which is rotatable about the central vertical axis of the traveler and to which the bottom end of a pull cable 48 is secured, its top end being secured to the float 42. The traveler is provided in order to permit the cables, which may become twisted about each other due to wave action, to be separated and placed in their proper vertical substantially parallel positions relative to one another merely by pulling upwardly at the surface on the pull cable 48 and moving the traveler upwardly on the guy cables. It will be apparent, of course, that such cable preferably may extend upwardly through the float during the upward movement of the pull cable and traveler so that the float may also rotate on the water as required by the untwisting of the guy cables.

The male section 50 of the coupling includes a tubular spacer 51 on whose upper end is telescoped the usual top flange 52 rigidly secured to the spacer body by a weld 53. The top flange is adapted to be secured to the bottom flange 54 of the bottom section of the riser pipe 11 by bolts 55 with the usual seal ring 56 disposed in the aligned annular facing recesses of the flanges to seal between.

The male coupling section 50 of the coupling includes a male connector member 58 in the upper enlarged portion 59 of whose internal bore or passage is telescoped the bottom end portion of the spacer 51 and secured thereto by a weld 60. The lower prong portion 61 of the male connector member has a downwardly and inwardly inclined outer annular surface 62 which is of the same configuration as the internal surface 24 of the female connector member 20 so that the prong portion 61 is telescopical in the female connector section into wedged engagement therewith.

The prong portion of the male connector member intermediate its ends is provided with an external annular dog recess 66 which is alignable with the lock recess 25 of the female connector member when the prong portion is wedged therein. A plurality of circumferentially spaced lock dogs 68 are slidably positioned in the dog recess and are biased outwardly toward expanded positions by springs 71 disposed about guide pins 72 whose inner end portions are rigidly secured, as by a press fit, in bores 73 which open radially outwardly to the dog recess. The male connector member is provided with recesses 75 about the bores 73 into which the inner end portions of the springs 71 extend. The outer portions of the pins extend slidably through bearings 76 secured in the enlarged inner portions 77 of the bores 78 of the lock dogs.

The lock dogs have upwardly and outwardly extending arcuate lower cam surfaces 83 and upwardly and outwardly inclined arcuate surfaces 85 to cause the dogs to be cammed inwardly by the engagement of these dog surfaces with the surface 24 as the prong portion 61 of the male connector member 58 moves into the female connector member.

Outward movement of the dogs is limited by their top and bottom lugs or pins 88 and 89 threaded in suitable bores of the dogs which engage the top and bottom split retainer rings 91 and 92, respectively, which are positioned in top and bottom external recesses 94 and 95 of the male connector body above and below the dog recess and close the outer ends of the upper and lower grooves 96 and 97, respectively, of the portion 61 which open to the dog recess and in which the lugs are movable.

The prong portion 61 of the male connector body is also provided with external annular recesses above and below the dog recess in which are positioned the O-rings 98 and 99, which are adapted to seal between the two connector members when the prong portion of the male connector member is telescoped in the female connector member. The lock dogs when in their outer expanded positions extend into the lock recess 25 and then their top surfaces 101 engage the top annular downwardly facing stop shoulder or surface 102 defining the upper end of the lock recess and thereafter prevent upward movement of the male connector body from the female connector body.

The male connector body has an inlet passage 104 whose lower end opens to the upper end of one of the grooves 97 and to whose upper end is secured, by a suitable coupling or fitting 105, a conduit 106 which may extend to the surface and through which a suitable sealing agent may be forced into the dog and lock recesses to effect a seal therebetween and further to bond or adhesively secure the male and female connector members to one another. The sealing agent may be any suitable grout or epoxy which will set or harden. The male connector member also has a vent or outlet passage 107 which is diametrically spaced from the inlet passage 104 and through which any water or air present in the lock and dog recesses may escape as the liquid or plastic sealing agent is forced into the dog recess through the inlet passage 105. Preferably, a vent conduit 108 is connected to the upper end of the vent passage by a suitable fitting or coupling 109 to permit such air and water to escape to the surface. If desired, the conduit 108 at the surface of the body of water may be provided with a valve for closing its upper end so that when the lock and dog recesses are completely filled with the sealing and bonding agent, the bonding agent may be placed under a predetermined pressure to ensure that it completely fills the two lock recesses and any space between the connector members above the line of sealing engagement of the O-ring 99 to ensure that a permanent fluid type seal is obtained between the two connector members and that maximum areas of the surfaces of the connector members are secured to one another by the sealing agent when it sets.

Three hydraulic rams 115a, 115b and 115c are mounted on the male connector member 58 and spaced apart 120 degrees. The ram 115a includes a cylinder 116 whose lower end is threaded in an annular base member 117 which is secured to the bottom flange by a plurality of bolts or screws 118 which extend through apertures in the base member into threaded bores 119 of the male connector member. The piston 120 of the ram is biased upwardly by a spring 121 disposed about the piston rod 122. The top end portion of the spring bears against the downwardly facing annular shoulder 123 of the piston flange 124 and its bottom end portion bears against the base 117. The piston flange may be provided with suitable seal means, such as an O-ring 125, which seals between the piston flange and the internal surface of its cylinder 116. The piston rod extends slidably downwardly through the aligned apertures 28a and 129a of the base member and the bottom flange, respectively.

The piston rod above its lower end is provided with a transverse slot 131 in which a pair of latch members 132 and 133 are disposed and are pivotally mounted on a pivot pin 134 which extends through the slot and through aligned apertures of the latch members. The latch members are biased outwardly and downwardly in opposite directions by a spring 136 coiled about the pin whose opposite hooked ends bear against the inner edge surfaces, respectively, of the latch members 132 and 133. Downward and outward pivotal movement of the two latch members is limited by the engagement of their outer downwardly facing edge surfaces 143 and 144 with the upwardly facing surface or stop shoulder 146 defining the bottom end of the slot. The lower end of the piston rod has a conical or downwardly and inwardly inclined annular surface 148.

Hydraulic liquid under pressure is introducible into the upper end of the cylinder 116 above the piston by means of a conduit 150 one of whose ends is connected to the upper end flange 151 of the cylinder by a suitable fitting 152. The other end of the conduit 150 is connected by a fitting or connector 155 to a manifold 156 which is secured to the spacer 51 in any suitable manner, as by brackets 157 which may be welded to rings 158 rigidly secured on the spacer 51.

Fluid under pressure is introduced into the lower end of the cylinder 116 through a conduit 159 one of whose ends is connected by a fitting 160 to the cylinder 116 and whose other end is connected by a fitting 161 to a manifold 162 also secured by suitable brackets 163 to the rings 158.

The piston flange is provided with a flow passage 164 whose lower outwardly and downwardly flared portion is closed by a plug 165 which is molded therein of a suitable metal which, when a predetermined downward force is exerted thereon will shear or fail at its external rib 166 which is cast in an annular groove of the flared portion of the groove and permit the plug to fall downwardly into the recess R of the piston rod 122. The depth of the recess R and the size of the plug 165 and the passage 164 have been exaggerated in the FIGS. 3 and 8 for clarity of illustration.

The rams 115b and 115c being identical in structure to the ram assembly 115a, their components have been provided with the same reference numerals, to which the subscripts b and c, respectively, have been added, as the corresponding elements of the ram 115a.

Hydraulic liquid is introducible into and exhaustible from the manifold 156 through a flexible conduit C1 connected to the upper end of the manifold and into and from the manifold 162 through a flexible conduit C2 connected to the manifold 162.

The flanges 52 and 54 of the male coupling section and of the riser pipe 11 are provided with three aligned pairs of apertures 167 and 168 which are spaced 120 degrees apart and in vertical alignment with similarly spaced three passages 169 of the male connector member 58. The male connector member 58 is also provided with three vertical passages 171 spaced 120 degrees apart in which are receivable the positioning members 35a, 35b and 35c. A waterproofed microswitch 172 is disposed in one of the passages for connecting the conductors 173 and 174, which extend from the microswitch to the surface, when the operator member or push button 176 of the microswitch is engaged by the guide member 35a to close a suitable electric signal circuit.

The lower ends of the passages 171 are defined by downwardly and outwardly extending annular cam surfaces 178 to facilitate or guide the movement of the guide members 35 into the lower ends of the passages 171. The lower end of the electric cable which includes the conductors 173 and 174, is secured to the male connector member by a suitable adapter or bushing 180 which may be threaded or otherwise secured in the upper end of the passage.

Figure 1:
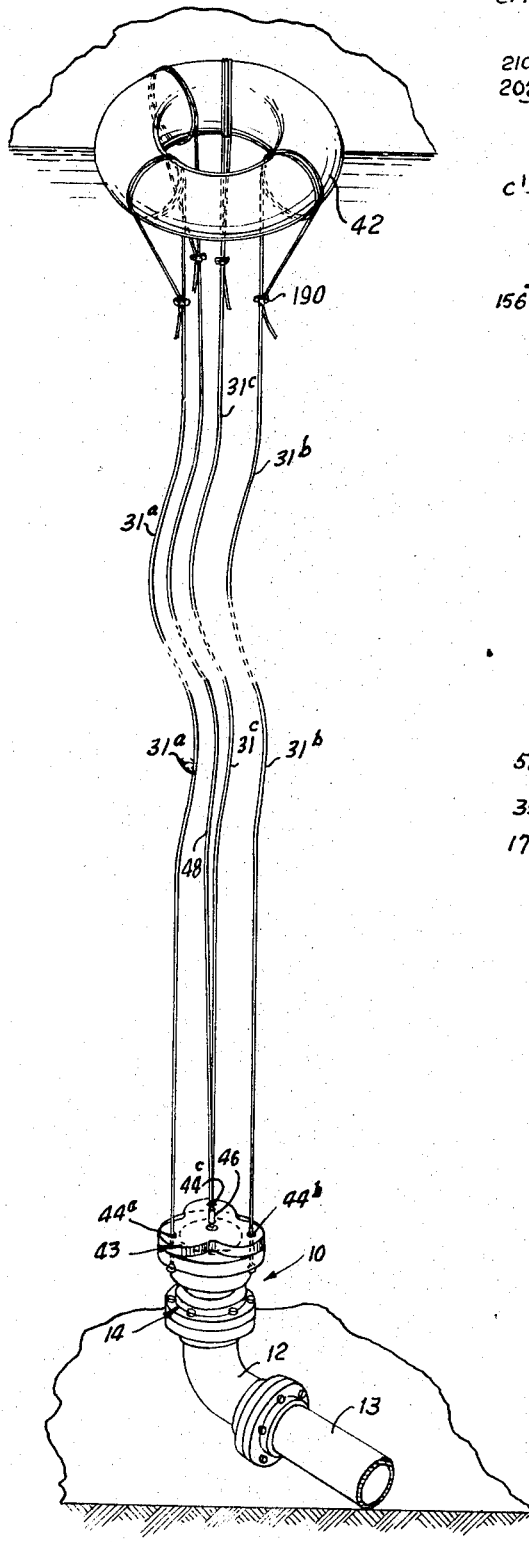
FIG. 1 is a perspective view showing an underwater pipe whose end is provided with the female section of a coupling embodying the invention and showing pull and guy cables secured thereto and extending to a float.

In use, at the time of the laying of the pipe 13 on the earth at the bottom of a body of water, as shown in FIG. 1, or in a trough formed in the earth at the bottom of a body of water, the female coupling section 14 and the frangible disk 20 are connected to the upper end of the end section 12 of the pipe so that water may not enter into the pipe or any fluid which may be present in the pipe, such as oil, will not flow up outwardly through the end section 12. The guide cables 31a, 31b and 31c are also secured to the flange of the female connector member and the female connector member is filled above the closure disk with a suitable liquid of substantially the same specific gravity as the water in which the pipe is to be laid. A film of or sheet of polyethylene or the like is then formed over the upper open end and adhesively secured or bonded to the flange 27 to close the upper end of the female coupling section and close the ends of the latch bores so that water may not enter into the female coupling section or into the latch bores. The lower ends of the latch bores may be closed by plugs 181 releasably held by friction in the lower ends of the latch bores.

The lower end portions of the guy cables 31a, 31b and 31c are then passed downwardly through the aligned pairs of passages 44a and 29a, 44b and 29b, and 44c and 29c, respectively, of the traveler and the top flange 27 of the female connector member. The sleeves 32 are then secured to the lower ends of the guy cables in any suitable fashion and then telescoped upwardly into the passages 29 to limit upward movement of the bottom end portions of the guy cables relative to the female coupling section. The upper end portions of the pull cable and the guy cables are then secured to the float 42, as by wrapping several turns of each cable around the torus shaped float and then securing their free ends, as by suitable clamps 190, to intermediate portions thereof. The cables are of such length as to extend from the female section to the surface of the water and provide sufficient slack therein to permit the float to move on the surface of the water when subjected to wave and wind forces to minimize the forces exerted by the cables on the female coupling section due to such forces.

The film or cover of polyethylene now prevents barnacles, sand, salt and the like from fouling the wedge and seal surface 24 and the surfaces defining the latch bores 28 of the surface 24 and the surfaces defining the latch bores 28 of the female coupling section. The liquid which fills the female coupling section and also the latch bores, prevents rupturing of the polyethylene film or cover by the pressure of the water as the end section 12 of the pipe with the female coupling section 12 secured thereto is lowered through the water to the bottom. The plugs 181 are held in the latch bores by friction and are displaceable downwardly therefrom by downward forces imparted thereto by the bottom ends of the piston rods, as will be explained below.

The end of the pipe 13 having the end section 12 may, of course, be the first portion or the last portion of the pipe 13 to be laid at the bottom of the body of water from a pipe laying vessel, or the pipe 13 may be a branch pipe of a pipe line having one or more such branch lines.

The float 42 will then float on the surface of the water, indicate the location of the end section 12 and hold the upper end portions of the pull and guy cables at the surface where they are readily accessible for further operations.

When it is thereafter desired to secure the lower end of the riser pipe 11 to the pipe end section 12 so that fluids may flow from or into the pipe 13 through the riser pipe, the vessel or barge having proper means for connecting pipe sections to one another to form the riser pipe of a length sufficiently great to extend from the end section 12 to above the surface of the water, is moved to the location of the float and above the end section 12. The upper end portion of the pull cable is then disconnected from the float and pulled upwardly through the middle of the float 42 and connected to a suitable hoist means carried by the vessel which then moves the traveler upwardly on the guy cables. If the guy cables have been twisted about each other due to the effect of wave or wind action on the float 42 or of water currents on the cables and the float, such upward movement of the traveler causes the guy cables to untwist and, of course, the float to rotate on the surface as the guy cables are thus untwisted.

The upper ends of the guy wires 31a, 31b and 31c are passed through the passages 167 of the top flange 52 of the male coupling section and the vertically aligned passages 168 of the bottom flange 54 of the riser pipe. The guy cables 31a, 31b and 31c, which as described above, are provided with suitable identifying indicia, are so oriented relative to and about the male coupling section and are held in tension by suitable hoist means of the vessel so as to be in substantially vertical and parallel relationship so that as the male connector member is moved downwardly and approaches the female coupling section, the engagement of the guy cables with the surfaces of the male connector body defining its bores 169, will tend to cause the riser pipe to rotate about its vertical axis to such position that the passages are moved into substantial vertical alignment with the guide members 35a, 35b and 35c, respectively, and the bores 129a, 129b and 129c into substantial vertical alignment with the latch bores 28a, 28b and 28c, respectively.

Figure 4:
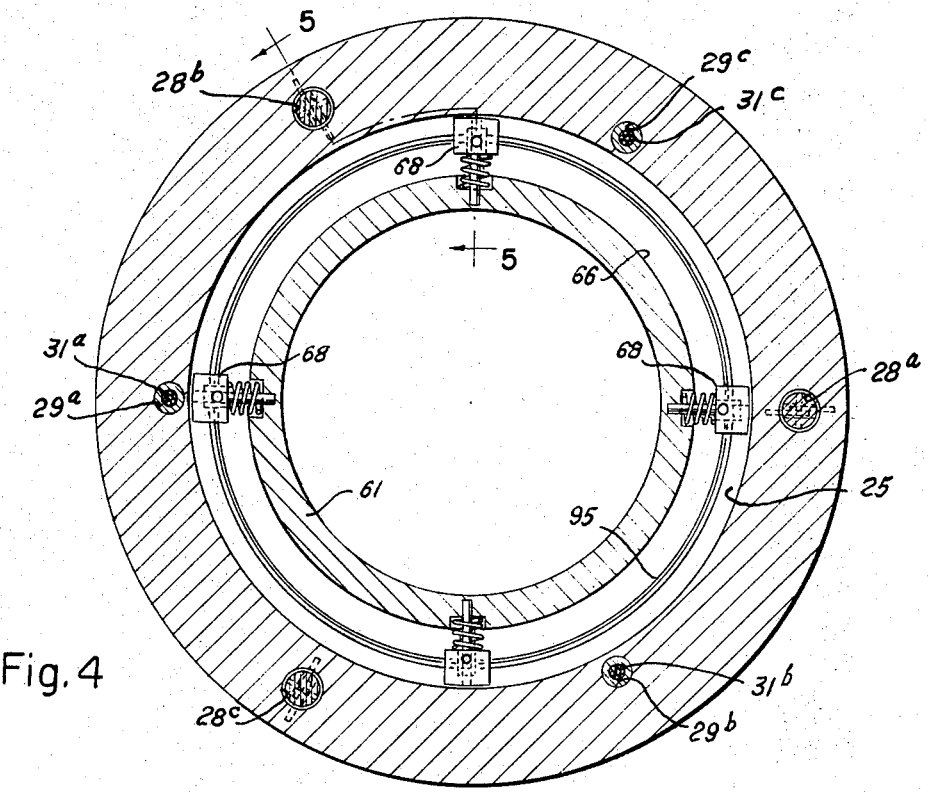
FIG. 4 is a sectional view taken on line 4—4 of FIG. 3.

The pistons of the rams 115a, 115b and 115c are now in their upper retracted positions, as illustrated in FIG. 4, with their latch members in their retracted positions in the bores 129a, 129b and 129c, respectively, of the male connector member. The rams, the various conduits connecting the ram cylinders to the manifolds, the manifolds and the hydraulic lines or conduits C1 and C2 are preferably filled with hydraulic fluid before the male coupling section is moved downwardly into the water.

As the male coupling section is moved vertically downwardly through the water on the bottom end of the riser pipe 12, the guide cables guide it toward vertical alignment with the female coupling section and also tend to exert an axial rotational force on the riser pipe in such manner as to position the passages 129a, 129b and 129c of the male connector member in vertical alignment with the latch bores 28a, 28b and 28c, respectively, and its passages 171 into vertical alignment with the guide members 35a, 35b and 35c, respectively. The means of the vessel for lowering the riser pipe into the water, of course, permits such axial rotation of the riser pipe about its vertical central axis.

As the prong portion of the male connector member 58 is thus moved into substantial alignment with the top end of the central passage of the female coupling section, defined by the upper end of the upwardly and outwardly inclined annular cam and seal surface 24, and approaches the female connector section, the lower end of the prong portion 61 which is of smaller external diameter at its lower end than the diameter of the upper end portion of the surface 24, moves into the central passage of the female coupling section, breaks or ruptures the polyethylene coat and then the camming engagement of the surfaces 24 and 62 of the female and male connector members moves the two members into axial vertical alignment as the prong portion 61 moves into fully telescoped position in the female connector member. During this downward telescopical movement of the prong portion into the female connector member as the dogs 68, which are yieldably held in their outer expanded positions by their springs 71, move downwardly into the female connector member, their bottom cam surfaces 183 engage the upper portion of the cam and seal surface 24, and the camming engagement therebetween then moves them inwardly against the resistance of their springs until the top surfaces 101 of the dogs move below the surface 102 of the female connector body whereupon the springs move the dogs outwardly into the lock recess.

As the prong portion 61 moves downwardly in the female connector body and prior to the movement of the top surfaces of the dogs below the stop shoulder 102 of the female connector body, the outer bottom annular surface 192 of the male connector body reaches the level of the top surfaces of the guide members 35 and (if the male connector body is not properly oriented about its central axis relative to the female connector body, that is, if the lower ends of its passages 171 are not vertically aligned above and with the positioning members 35a, 35b and 35c, downward movement of the male connector member will be arrested due to the engagement of this bottom surface 192 with the top ends of the pins. In this case, when the downward movement of the riser pins is thus arrested, the signal circuit of the apparatus, which may include a battery 194, an electric lamp and a battery 196 connectible in series by the switch 172 when it is closed, is not energized and the operator is thus made aware that the desired axial orientation of the male connector body with the female connector body has not been achieved and that it is necessary to rotate the riser pipe about its vertical central axis in one direction or the other to achieve this orientation. Since the lengths of the portions of the guy cables between the bottom surface 192 of the male connector body and the top surface of the top flange 27 of the female connector member are relatively short, when the bottom surface 192 reaches the level of the top surfaces of the positioning members, and since the guy cables are held under tension and in substantial vertical positions by suitable hoist means on the vessel, in most instances the guy cables themselves will so orient the riser pipe that any misalignment of the passages 171 with the positioning member 35 will be so slight that the camming engagement of the surfaces 36 and 178 will cause such further rotation and proper alignment.

In any event, when the male connector body moves downwardly and into proper alignment with the female connector member, the engagement of the top surface of the guide member 35a with the push button 176 will cause closure of the microswitch and the bulb 195 will be energized giving the signal to the operator on the vessel that the two connector members are properly telescoped in proper axial orientation to one another so that the passages 129a, 129b and 129c of the male connector member are in vertical alignment with the latch bores 28a, 28b and 28c, respectively.

As the downward movement of the riser pipe and the male connector body continues after the button switch member 176 is actuated the top surfaces 101 of the dogs move below the stop shoulder 102 and the dogs are moved outwardly into the lock recess 25 by their springs.

Once the male coupling section is propely telescoped in the female coupling section, the lock dogs prevent disconnection of the male coupling section from the female coupling section even though various forces of considerable magnitude may be imposed on the riser pipe due to wave action, water currents or the movement of the vessel itself which might otherwise perhaps result in the disconnection of the male section from the female section, it being obvious to those skilled in the art that the riser pipe which may be of considerable length, for example, two thousand feet, even though formed of steel, will flex or bend between the vessel and its now fixed end to accommodate such extraneous forces during the interval of time necessary to complete the permanent connection of the two coupling sections to one another.

It is preferable not to exert an upward force in the riser pipe to determine if proper connection of the two coupling sections has been made, it being apparent that a greater upward force would be necessary to raise the riser pipe once its lower end has ben connected to the end section 12 of the pipe 13 since this could result in undesired movement of the pipe 13 itself. The lighting of the signal bulb and the immediate subsequent further downward movement of the riser pipe will indicate and assure that the dogs have been moved into alignment with the lock recess and that they have been moved outwardly thereinto.

At the time of the connection of the male coupling section to the bottom end of the riser pipe 11, the ram cylinders, the manifolds, the conduits connecting the ram cylinders to the manifolds and the conduits C1 and C2 are preferably filled with hydraulic fluid. The springs of rams hold their pistons in their upper retracted positions with the catch members of the rams 115a, 115b and 115c in their associated passages 129a, 129b, and 129c, respectively, and thus it is not necessary to hold the pistons in their upper retracted positions by fluid pressure.

The top end of the conduit or hydraulic line C1 which is connected to the manifold 156 is then connected on board of the vessel to one port fitting 201 of a four-way valve 202. The upper end of the other conduit C2 which extends from the manifold 162 is connected by means of a suitable connector or coupling 204, a conduit 205, a manually operable pressure regulator valve 206 and a conduit 207 to a second port fitting 208 of the four-way valve. The third port fitting 210 of the four-way valve is connected to the outlet of a pump 211 by a conduit 212 between the gauge and the valve port fitting 210. nected, a pressure gauge 214 is connected to the conduit 212 betwen the gauge and the valve port fitting 210. The inlet of the pump is connected by a conduit 215 to a reservoir or tank 216 of a hydraulic fluid and the fourth port fitting 217 of the four-way valve is connected by the conduit 218 to the reservoir.

A pressure gauge 219 is preferably connected to the conduit 205.

The four-way valve which may have a manually operable control member 220 is then moved to such position that it will place its port fitting 201 in communication with the port fitting 210 and its port fitting 208 in communication with the port fitting 217 so that fluid moved by the pump may then flow downwardly through the conduit C1 to the manifold 156 and fluid from the manifold 162 may flow through the conduit C2 back to the reservoir 215. The pressure regulator valve 213 is manually adjusted to set the maximum pressure in the conduit 212 which will limit the downward forces exerted by fluid pressure in the cylinders above the piston to such value as will not result in the downward dislodgment of the plugs 165 from the piston passages 164. The valve 206 is then opened and the pump placed in operation.

Figure 2:
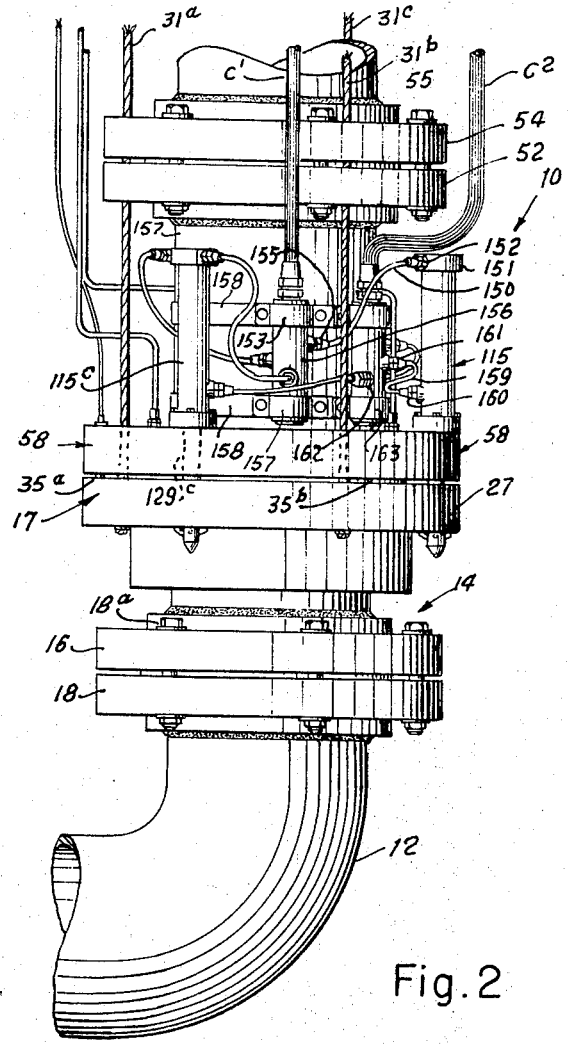
FIG. 2 is a fragmentary plan view of the coupling embodying the invention showing it connecting the lower end of a riser pipe to the end of the underwater pipe.
Figure 3:
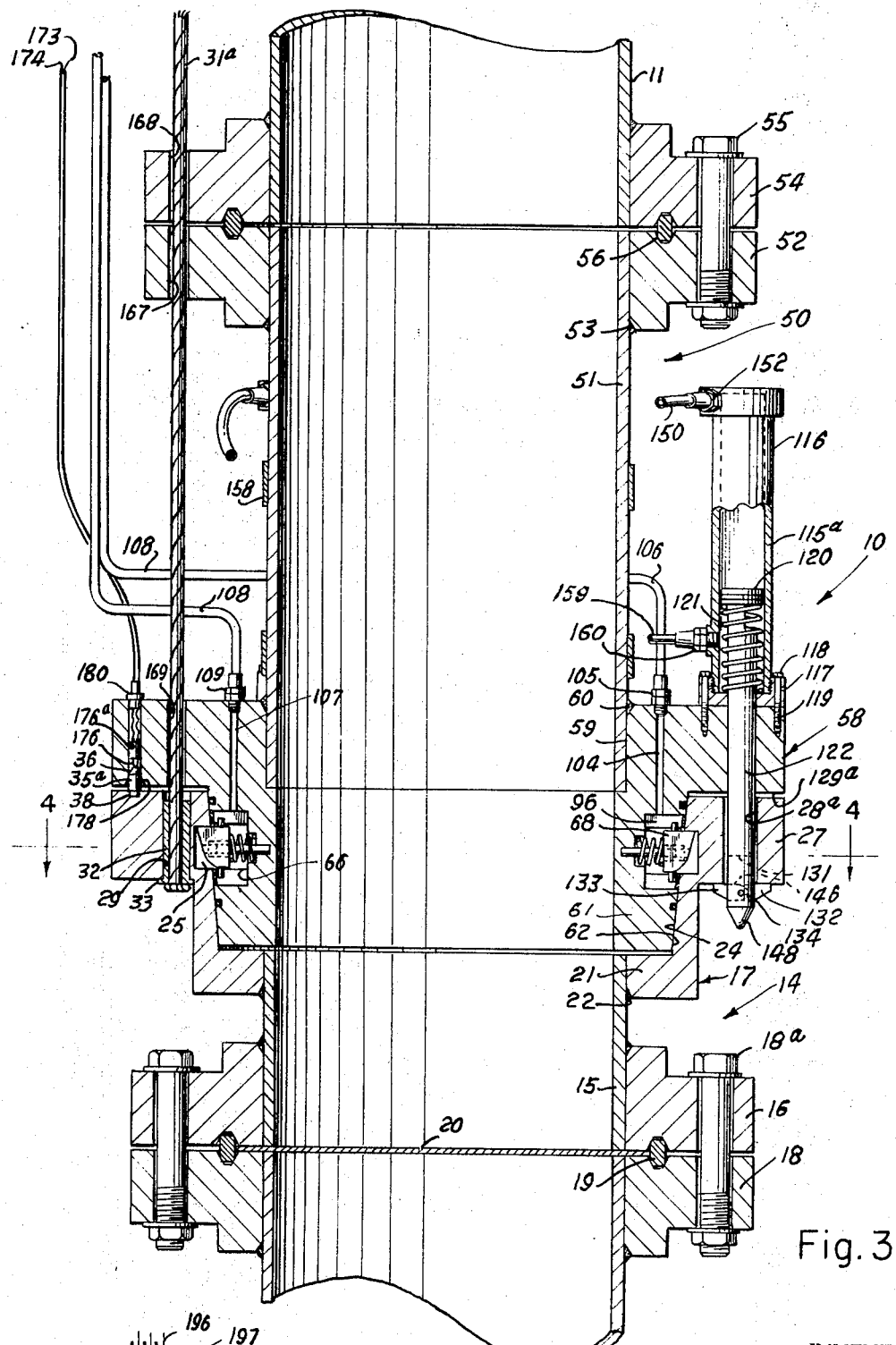
FIG. 3 is an enlarged, vertical sectional view, with some parts removed, of the coupling shown in FIG. 2.

As hydraulic fluid under pressure is thus delivered to the manifold 156 and through its conduits 150, 150a and 150b to the upper ends of the cylinders of the three ram assemblies, while the hydraulic fluid in the cylinders below the pistons of the rams may flow to the reservoir 216, the force of the pressure differential thus created across the pistons now moves the pistons of the rams downwardly against the resistance of their springs and the lower ends of the piston rods 122a, 122b and 122c move downwardly into the latch bores until the upper ends of the latch members move out of the latch bores and then are moved outwardly by their springs 136 to their expanded positions illustrated in FIGS. 2 and 3 of the drawings. At this time the pistons are positioned above the locations of the communication of the fittings 160 with the cylinders and are held against further downward movement by the springs which are now fully collapsed or by suitable upwardly facing stop shoulders engageable by the pistons which may be provided for this purpose.

When all pistons have been moved to their fully extended positions with the latch members of their piston rods below the bottom surface of the flange 27, flow of hydraulic fluid through the conduit 218 into the reservoir stops, thus indicating to the operator that he may now reverse the flow of hydraulic fluid through the conduits C1 and C2. The pump may have usual pressure controlled bypass means to bypass the fluid pumped thereby from its outlet to its inlet when the pressure regulator valve prevents further flow therethrough. The pressure in the upper ends of the ram cylinders is now below the value thereof necessary to cause dislodgment of the plugs 165. The operator then reverses the position of the four-way valve to cause it to provide communication between its port fittings 201 and 216 to permit the flow of the hydraulic fluid from the manifold 156 to the reservoir 216 and simultaneously to provide fluid communication between its port fittings 208 and 210 so that the fluid pumped by the pump will now flow through the conduit C2 to the manifold 162. After the reversal of the four-way valve, the operator opens the valve 213. The pistons are now biased upwardly not only by the force of their springs 121 but also by the force of the pressure of the hydraulic fluid communicated to the lower ends of their cylinders below their pistons. A relatively high pressure per square inch may now be maintained in the cylinders below the pistons since the wedge fit of the plugs 165 prevents them from being forced upwardly through the passage 164. As a result, the two connector members 14 and 50 are now urged or forced toward fully telescoped and wedged position at three locations spaced relatively great distances from the central common longitudinal axis thereof and spaced outwardly of the location of wedging engagement of the wedge surfaces 24 and 62 since the dogs are somewhat shorter in height than the height of the lock recess 25. As a result even though the riser pipe which extends to the surface may have various lateral and rotational forces imparted thereto due to wave and current action thereon or on the vessel, no movement can take place between the male connector member 58 and the female connector member 17.

If it is necessary or desirable, due to the particular properties of the sealing or bonding agent, that the various surfaces of the male and female connector members exposed to or communicating with the lock and dog recesses thereof and to which the sealing or bonding agent is to adhere or bond must be clean of the fluids to which they have been previously exposed, a suitable cleaning liquid may then be circulated under pressure through one of the conduits 106 into the dog and lock recesses and then removed from the passages through the condut 108. It will be apparent, of course, that the direction of flow of such cleaning liquid may be reversed several times to ensure that all surfaces to which the sealing agent is to bond or adhere are thus properly cleaned.

After such cleaning, if it is necessary, or immediately after the pistons have been moved upwardly and in either case while hydraulic fluid under pressure is communicated to the lower end of the ram cylinders, one of the conduits, for example, the conduit 106, at its upper end is connected to a source of the sealing and bonding agent in liquid or plastic form which is then forced or pumped downwardly through the conduit 106 and the passage 104 into one of the grooves 96 and thus to the upper end of the dog passage 66 and into the lock recess 25. The sealing agent thus fills the dog and lock recesses and fluid previously present in such recesses will now be expelled ahead of such sealing agent through the vent passage 107 and the conduit 108 to the surface. Once the dog and lock recesses, as well as any spaces between the two connector members above the lower O-ring have been filled with the sealing agent, which may be determined either by forcing a volume of the sealing agent sufficiently great that it will fill all such spaces or by continuing to force such sealing agent through the conduit 106 until sealing agent flows out through the top end of the conduit 108. The conduit 108 is then preferably closed by a suitable valve and the plastic sealing agent is then held under predetermined pressure in the conduits and the connector members to assure that it fills all empty spaces and is held in intimate bonding or adhesive contact with all surfaces of the two connector members which it contacts.

Such pressure can be maintained by any suitable means such as a pump if a pump has been used to circulate the sealing agent between the two connector members or by the pressure of a gas if the sealing agent has been dispensed from a closed container thereof by gas under pressure in the top portion of the container. The sealing agent is then maintained under such pressure, while the pistons of the hydraulic rams continue to have an upward force exerted thereon by the hydraulic fluid from the manifold 162, for a period of sufficiently long for the sealing agent to harden or set and rigidly secure and bond to the surfaces of the two connector members which it contacts to one another and to seal therebetween.

When the sealing agent has set, the four-way valve 202 is again operated to cause hydraulic fluid under pressure to be admitted to the manifold 156 while permitting the fluid from the manifold 162 to flow to the tank reservoir 216. The pressure regulator valve 214 is now set and the pistons will now again be moved downwardly until their downward movement is arrested due to the full compression of their springs. The pressure differential across the piston flange, by appropriate adjustment of the pressure regulator valves 206 and 214, is then raised to such high value that the plugs 165 shear or fail at the locations of their bonds or adhesion to the pistons and are forced downwardly from the passages 164. Fluid communication is thus established between the upper and lower ends of the ram cylinders through the passage 164. Once the plugs have been dislodged from the pistons, which will be indicated by a rise in the pressure indicated by the gauge 206, the flow valve 213 is closed, the valve 206 is opened, the conduits C1 and C2 are disconnected from the coupling 204 and the port fitting 201, respectively, and the pistons are moved to their positions by the force of their springs 121 which thereafter exert a force thus tending to move the male connector member into the female connector member. One of the conduits C1 or C2 may then be connected to a source of cleaning liquid, if the properties of the sealing agent require that the surfaces of the cylinders be clean of hydraulic fluid for the sealing agent to properly adhere or bond thereto, and such cleaning liquid is circulated through, for example, the conduit C1, the manifold 152, the conduits connecting the manifold 152 to the top ends of the ram cylinders, through the ram cylinders and the now open passages 164 of the piston flanges, the conduit connecting the lower end of the ram cylinders to the manifold 162 and thence through the conduit C2 to the surface. Such circulation of the cleaning liquid may be reversed several times if desired.

The conduit C2 is then connected to a source of the sealing agent under pressure, the upper end of the conduit C1 to which a suitable valve may now be connected is opened, and the sealing agent is now moved through the conduit C2, the manifold 162 and the conduits connecting the manifold 162 to the ram cylinders into the lower ends of the ram cylinders and then flows upwardly through the passages 164 to the upper ends of the cylinders displacing any hydraulic fluid ahead of it through the conduits 150. Due to the restrictions provided by the passages 164, the pressure differential across the piston flange exerts an upward force on the pistons. The cylinders are thus filled with the sealing agent above and below the pistons. Preferably a sufficient quantity of the sealing agent is circulated that it fills not only the cylinders but also the manifolds and the conduit C1. The conduit C1 is then closed at the surface and the sealing agent is held under pressure until it sets and hardens.

When the sealing agent has set or hardened it will hold the pistons rigid with the cylinders and thus provide an additional means holding the two connector members rigid with one another against all forces which may be exerted thereon.

When the sealing agent in the ram cylinders has set or hardened, the conduits C1 and C2, the electric cable the conduits 106 and 108, and the guy cables may be severed at the surface of the water or below the water at any desired depth by a suitable cutting means.

If desirable or necessary, a cleaning fluid may be circulated down through the conduit C2, the rams and the conduit C1 under pressure before the circulation of the sealing agent therethrough to clean the surfaces of the cylinders prior to the filling thereof with the sealing agent.

It will be apparent that a very strong rigid connection is established between the two coupling sections by the sealing agent, such as an epoxy or a grout, which may fill the recesses 25 and 66 and not only adhesively bond or secure the two sections to one another but hold the dogs 68 against any movement toward their retracted positions. In addition the rams 115 will also hold the two sections against movement relative to one another.

It will also be apparent that while the male coupling section has been shown as having only four lock dogs 68, the number of lock dogs may be increased or decreased as required in a particular application.

Figures 5, 7, 8:
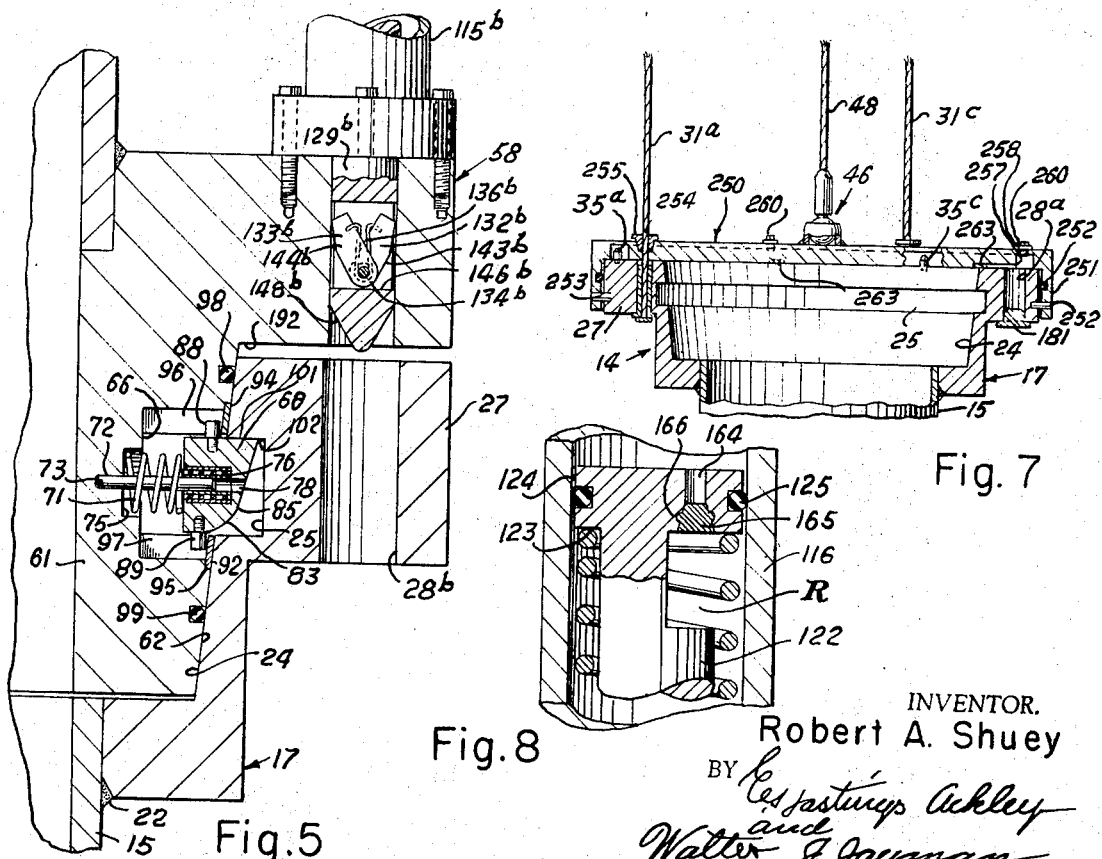
FIG. 5 is an enlarged sectional view taken on line 5—5 of FIG. 4.
FIG. 7 is a fragmentary partly sectional view of a modified form of the means for closing the end of the female coupling section.
FIG. 8 is an enlarged partly sectional view of one of the rams of the coupling.

Referring now to FIG. 7, if the riser pipe is not to be connected to the end section 12 of the pipe 13 for a relatively long period of time after the pipe 13 has been laid, a film of polyethylene might fail during such long period of time, the traveler may be replaced by a cover 250 whose annular dependent flange 21 is telescopical over the flange 27 of the female connector member 17 and is releasably securable thereto by a plurality of shear pins 252 which are receivable in suitable bores 253 provided in the flange 27. The cover flange 251 has an internal annular recess in which is disposed an O-ring 252 which seals between the flanges 251 and the flange 27. The cover 250 is provided with three passages 254 through which the guy cables 31a, 31b and 31c extend and with suitable bushings or gaskets 255 which seal between the cover and the guy cables but which permit movement of the cover relative to the guy cables. The cover also has a downwardly opening annular recess 257 into which the positioning members 35a, 35b and 35c extend and with a pair of apertures 258 which open to the annular recess 257 and which are closable by plugs 260 threaded therein. The annular recess 257 opens to the upper ends of the latch bores 28a and is placed in communication with the central bore passage of the female connector section by suitable downwardly opening grooves or recesses 263 which extend inwardly from the annular recess 257 to positions inwardly of the top end of the wedge surface 24 of the female connector member 17. The swivel connector 46 is, of course, connected to the central portion of the cover.

It will be apparent that at the time of the connection of the female coupling section 14 to the pipe and section 12, the cover is telescoped over the female coupling section 14 and is secured thereto by a desired number of shear pins 252. The plugs 260 are then removed and a suitable liquid is then introduced through one of the apertures 258 to fill the space between the cover and the female coupling section above the frangible closure disc 20, it being apparent that any air which may be then present will then escape through the other passage 258. When all spaces between the cover and the female connector section are thus filled with the liquid, which may be an oil or the like, the plugs 260 are then secured to the cover closing the passages 258 and the end section of the pipe is then lowered to the bottom of the body of water with the guy cables and the pull cable secured, in the manner previously described, to a float 42. At the time the riser pipe is to be connected to the end section 12, an upward pull is exerted on the pull cable 48 of sufficient force that the shear pins 252 fail, and, as the cover is moved upwardly on guy cables 31, if the guy cables have twisted about each other, they are untwisted by the cover in the same manner as by the traveler.

The plugs 181 which close the lower ends of the latch bores will be forced downwardly out of the latch bores by the bottom ends of the piston rods when the pistons are moved downwardly.

After the riser pipe has been connected to the end section 12 of the underwater pipe 13 by the coupling 10 and it is desired to establish fluid flow between the riser pipe and the pipe 13, the closure disc is broken by fluid pressure admitted to the upper end of the riser pipe or it may be drilled out by a suitable tool lowered through the riser pipe.

It will now be apparent that a new and improved coupling and method for connecting a riser pipe to the end of a subwater pipe has been illustrated and described which permit such connection by means located at the surface of the water and which do not require that a diver descend to the end of the subwater pipe to effect the connection.

It will further be seen that while the riser pipe has been described as being lowered from a vessel, it could be lowered from any suitable platform above the water at the location of the end section 12 of the underwater pipe, as for example, a floating platform or one secured to piles driven into the earth at the bottom of the body of water.

What is claimed and desired to be secured by Letters Patent is:

1. A method of connecting the end of a first flow conductor lowerable into the water from the surface of the body of water and having a coupling section connected at the bottom end thereof to a second flow conductor lying at the bottom of the body of water and having a second coupling section connected to its end, the coupling sections being telescopical relative to each other, and the second section having a plurality of flexible guide means connected thereto extending to the surface of the water, said method including: guiding said first coupling section into telescoped relationship with said second coupling section by means of the flexible guide means, providing a flow passage means from the surface of the water to said coupling sections between telescoped portions thereof through which a sealing agent may be transmitted to said coupling sections, and applying a force to said sections for holding the sections in telescoped relationship while introducing a sealing agent from the surface to said coupling sections between telescoped portions thereof through said flow passage means and continuing to exert said force until said sealing agent sets to rigidly secure the two sections to one another and seal therebetween.

2. The method of claim 1, and the additional step of locking the sections against disengagement after the sections have moved into telescoped relation.

3. The method of claim 2, wherein said holding force is applied to said coupling sections at locations radially spaced from the location of telescopical engagement of the two sections.

4. The method of claim 3, and the additional step of axially orienting the first coupling section relative to the second coupling section by means of the flexible guide means during the downward movement of the first section toward telescoped relation with the second section.

5. The method of claim 4, and the additional step of holding the sealing agent between the coupling sections under pressure until it sets.

6. A coupling for connecting the ends of two flow conductors, said coupling including: an annular female section connectible to the end of a first flow conductor; an annular male section connectible to the end of a second flow conductor, said female section having an internal annular wedge surface inclined inwardly in one axial direction and said male section having an annular prong portion telescopical in said one direction in one end of said female section and having an external annular wedge surfaces, said annular wedge surfaces of said coupling sections providing a wedged fit between said sections, said female and male coupling sections having annular recesses opening inwardly and outwardly, respectively, at their respective wedge surfaces and disposed in communication with one another when said prong portion is telescoped in said female section; and force means on one of said sections and engageable with the other of said sections when said sections are in telescoped relation for exerting a force on said sections tending to move said sections into telescoped and wedged relationship, one of said sections having means for introducing a fluid substance into said recesses when said coupling sections are in telescoped relationship for filling said recesses and rigidly holding said sections in telescoped sealed relation when said substance sets.

7. The coupling of claim 6, wherein said force means are disposed radially outwardly of said wedge surfaces and spaced thereabout.

8. The coupling of claim 7, wherein one of said coupling sections has lock means in its annular recess which is movable into expanded position in the recess of the other of said sections when said sections are in telescoped position, said lock means preventing disengagement of said sections from one another.

9. The coupling of claim 3, and means biasing said lock means relative to said one of said sections and toward the recess of said other of said sections.

10. The coupling of claim 9 wherein said force means comprise a plurality of pressure operated rams each having a cylinder mounted on said one of said sections and piston means movable in said cylinder and provided with latch means engageable with the other of said sections when said sections are in telescoped relation, said latch means being moved into position for engaging said other of said sections when said piston means are moved in one axial direction, said latch means exerting a force on the other of said sections when said piston means are biased in a direction opposite said one directing tending to move said sections into further telescoped relation.

11. The coupling of claim 10, wherein said second coupling is provided with a plurality of latch bores spaced radially outwardly of said internal wedge surface, the cylinders of said rams being mounted on said first coupling section and their piston means being movable through said latch bores.

12. The coupling of claim 11, and coengageable means on said coupling sections for orienting said sections axially to position said piston means in alignment with said latch bores.

13. The coupling of claim 12, and means carried by said sections for providing a signal when the two sections move into telescoped relation in proper axial orientation relative to one another.

14. The coupling of claim 7, and means carried by said sections for providing a signal when the two sections move into telescoped relation in proper axial orientation relative to one another.

15. A coupling for connecting the bottom end of a flow conductor lowerable into a body of water from the surface thereof to the end of a flow conductor disposed below the surface of the water, said coupling including: an annular female section connectible to the end of a subwater flow conductor; an annular male section connectible to the bottom end of a second flow conductor movable axially downwardly through the water for connection to the subwater flow conductor, said female section having an upwardly opening passage and an internal annular wedge surface inclined inwardly and downwardly, said male section having a lower annular prong portion thereof telescopical downwardly in said female coupling section and having an external annular wedge surface inclined inwardly and downwardly, said wedge surfaces of said coupling sections providing a wedged fit therebetween, one of said coupling section having an annular lock recess located between terminal ends of its wedge surface opening to its wedge surface and the other of said members having a lock means movable thereon between retracted positions wherein said lock means permits downward telescopical movement of one of said sections, relative to the other and expanded positions wherein said lock means extends into said lock recess for engaging said one of said sections and preventing upward disengagement of said male section from said female section.

16. The coupling of claim 15, wherein said male member is provided with passage means for introducing a fluid substance between said sections intermediate the top and bottom ends of said wedge surfaces for sealing therebetween and rigidly securing the sections to one another.

17. The coupling of claim 16, wherein said lock recess is provided in said female section and said male section has an annular external recess opening outwardly at the wedge surface and opening to said lock recess when said coupling sections are in telescoped relation.

18. The coupling of claim 17, and means carried by one of said sections for sealing between said sections above and below said recesses when said sections are in telescoped relation, said passage means for introducing a fluid substance opening to said external recess of said male section.

19. The coupling of claim 18, wherein said female section outwardly of its internal wedge surface is provided with a plurality of circumferentially spaced latch bores, said male section having a plurality of rams mounted thereon and alignable with said latch bores, said rams having piston means movable downwardly through said latch bores and provided with latch means for engaging said female section when said latch members are moved below said latch bores, and conduit means for conducting fluid pressure to said rams for moving said piston means downwardly and upwardly.

20. The coupling of claim 19, wherein said piston means within the rams are provided with passage means having closure means therein which are movable to open said passage means when the downward pressure differential exerted across said piston means exceeds a predetermined value.

21. The coupling of claim 19, wherein said coupling sections are provided with positioning means co-engageable when said male section moves into telescoped position with said female section and with said rams in alignment with said latch bores.

22. The coupling of claim 21, and signal means operatively associated with said positioning means for providing a signal at the surface of the water when the male section moves into properly oriented telescoped position relative to said female section.

23. The method of claim 1, and the additional step of holding the sealing agent between the coupling sections under pressure until it sets.

24. The method of claim 2, and the additional step of holding the sealing agent between the coupling sections under pressure until it sets.

References Cited

UNITED STATES PATENTS

| | | | |
|---|---|---|---|
| 1,158,415 | 10/1915 | Boyle | 285—297 X |
| 1,494,523 | 5/1924 | Zwicker | 285—297 |
| 1,873,855 | 8/1932 | Wilson | 285—368 X |
| 2,848,255 | 8/1958 | Klein et al. | 285—321 X |
| 3,032,125 | 5/1962 | Hiser et al. | |
| 3,171,188 | 1/1963 | Roulins | 285—81 X |
| 3,171,674 | 3/1965 | Bickel et al. | 285—317 X |
| 3,240,511 | 3/1966 | Bishop et al. | 285—18 |
| 3,331,621 | 7/1967 | Bagnulo | 285—374 X |
| 3,345,084 | 10/1967 | Hanes et al. | 285—27 |
| 3,345,087 | 10/1967 | Hanes et al. | 285—321 X |

FOREIGN PATENTS 998,412  1/1952  France.

DAVE W. AROLA, Primary Examiner

U.S. Cl. X.R.

285—93, 297, 317, 332.3, 364